United States Patent [19]

Swenson et al.

[11] 4,072,287
[45] * Feb. 7, 1978

[54] SEAT SUPPORTING ASSEMBLY OF THE RESILIENTLY LOADED TYPE

[75] Inventors: Richard F. Swenson, Milwaukee; Shawn H. Eimen, Wauwatosa; John J. Gryga, Jr., Milwaukee, all of Wis.

[73] Assignee: Milsco Manufacturing Company, Milwaukee, Wis.

[*] Notice: The portion of the term of this patent subsequent to June 14, 1994, has been disclaimed.

[21] Appl. No.: 760,534

[22] Filed: Jan. 19, 1977

[51] Int. Cl.² ........................... F16M 13/00
[52] U.S. Cl. ................... 248/399; 248/421
[58] Field of Search .......... 248/399, 400, 421, 422; 297/244, 247, 248

[56] References Cited

U.S. PATENT DOCUMENTS

| 2,358,319 | 9/1944 | Dupee | 248/421 X |
| 3,085,778 | 4/1963 | Korn | 248/399 |
| 3,335,996 | 8/1967 | Hall et al. | 248/400 |
| 3,572,624 | 3/1971 | Holdampf et al. | 248/399 X |
| 3,599,232 | 8/1971 | Tabor | 248/399 |
| 3,608,855 | 9/1971 | Osenberg | 248/400 |
| 3,774,963 | 11/1973 | Lowe | 248/399 X |
| 3,814,370 | 6/1974 | Hurwitz | 248/400 |
| 3,888,451 | 6/1975 | Lacey | 248/399 |
| 3,917,209 | 11/1975 | Adams | 248/399 |
| 3,917,211 | 11/1975 | Daunderer et al. | 248/421 |

FOREIGN PATENT DOCUMENTS

| 458,615 | 8/1949 | Canada | 248/400 |
| 479,041 | 3/1953 | Italy | 248/399 |
| 744,577 | 10/1954 | United Kingdom | 248/421 |

*Primary Examiner*—Lawrence J. Staab
*Attorney, Agent, or Firm*—James E. Nilles

[57] ABSTRACT

A seat supporting assembly for resiliently supporting a vehicle seat which finds particular utility in tractors or other off-the-road vehicles. The seat supporting assembly includes an adjusting means, readily accessible to the operator and by which he can adjust both the height of the seat and the up-stop limit of the seat. A spring loaded mechanism is provided for the adjusting means which includes a pair of arms that have interengaging means that equalize movement of the adjusting mechanism.

10 Claims, 7 Drawing Figures

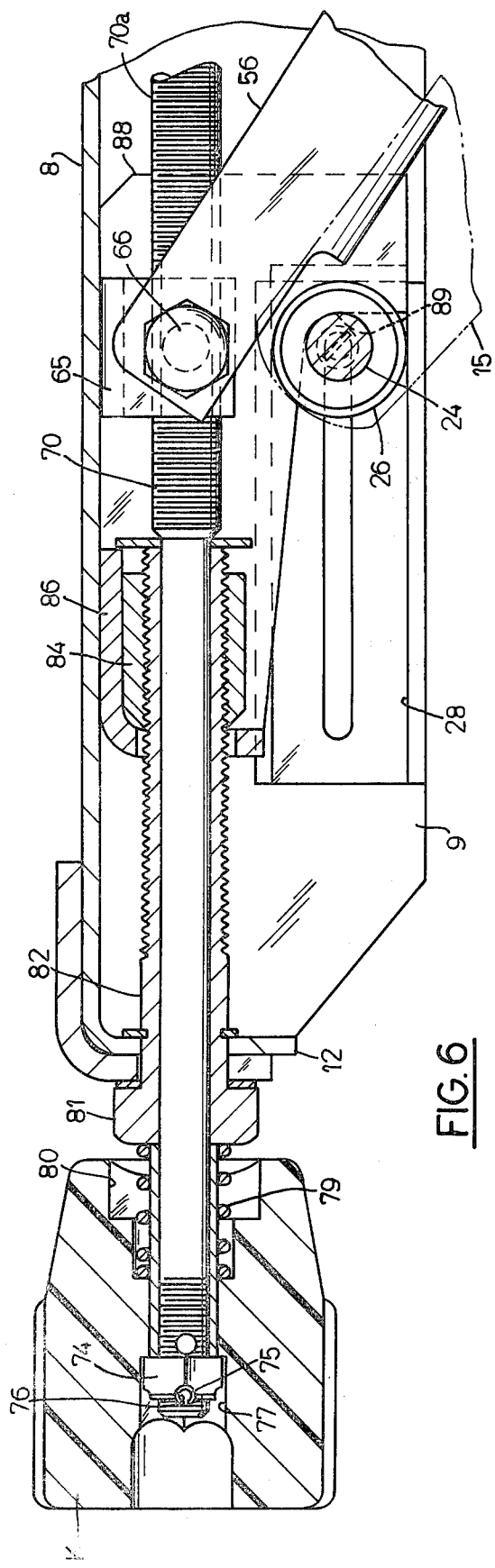
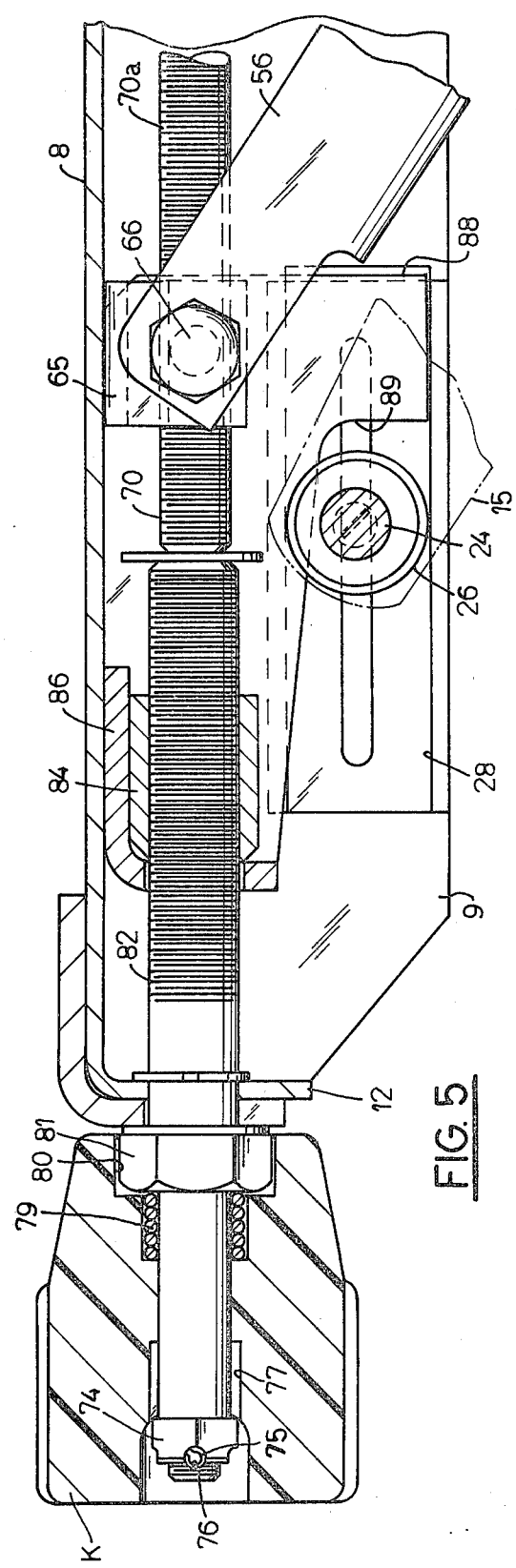
FIG. 6
FIG. 5

SEAT SUPPORTING ASSEMBLY OF THE RESILIENTLY LOADED TYPE

BACKGROUND OF THE INVENTION

The invention pertains to support means for resiliently supporting a seat such as found in tractors or preferably off-the-road vehicles. These resiliently supported suspension means are vertically adjustable to accommodate the operators and stops are provided for limiting the upward movement of the resiliently mounted seat. Thus means are provided in devices of this general character for adjusting the height of the seat and also for providing an adjusting "up-stop" to limit the upward movement of the seat.

The invention is an improvement over the seat supporting means shown in our co-pending application Ser. No. 654,570, filed Feb. 2, 1976 and entitled "Seat Supporting Assembly" now issued as U.S. Pat. No. 4,029,283 on June 14, 1977.

SUMMARY OF THE INVENTION

The present invention provides a resiliently loaded seat supporting mechanism for a vehicle seat and provides an improved adjusting mechanism for both the vertical height of the seat and also for the up-stop limit of the seat. An adjustable spring loaded mechanism is provided which equalizes the action of the adjusting mechanism to provide a smoothly operating adjustment with a minimum number of linkages, interconnecting parts, and other apparatus.

These and other objects and advantages of the present invention will appear hereinafter as this disclosure progresses, reference being had to the accompanying drawings.

BRIEF DESCRIPTION OF THE DRAWINGS

FIG. 5 is an enlarged, sectional view of a portion of the adjustment mechanism shown in FIG. 1, the adjusting knob being in the inward position for adjusting the up-stop limit of the seat;

FIG. 6 is a view similar to FIG. 5, but showing the knob when it is pulled outward so as to be capable of adjusting the vertical height or ride control of the seat.

DESCRIPTION OF A PREFERRED EMBODIMENT

Figure 2:
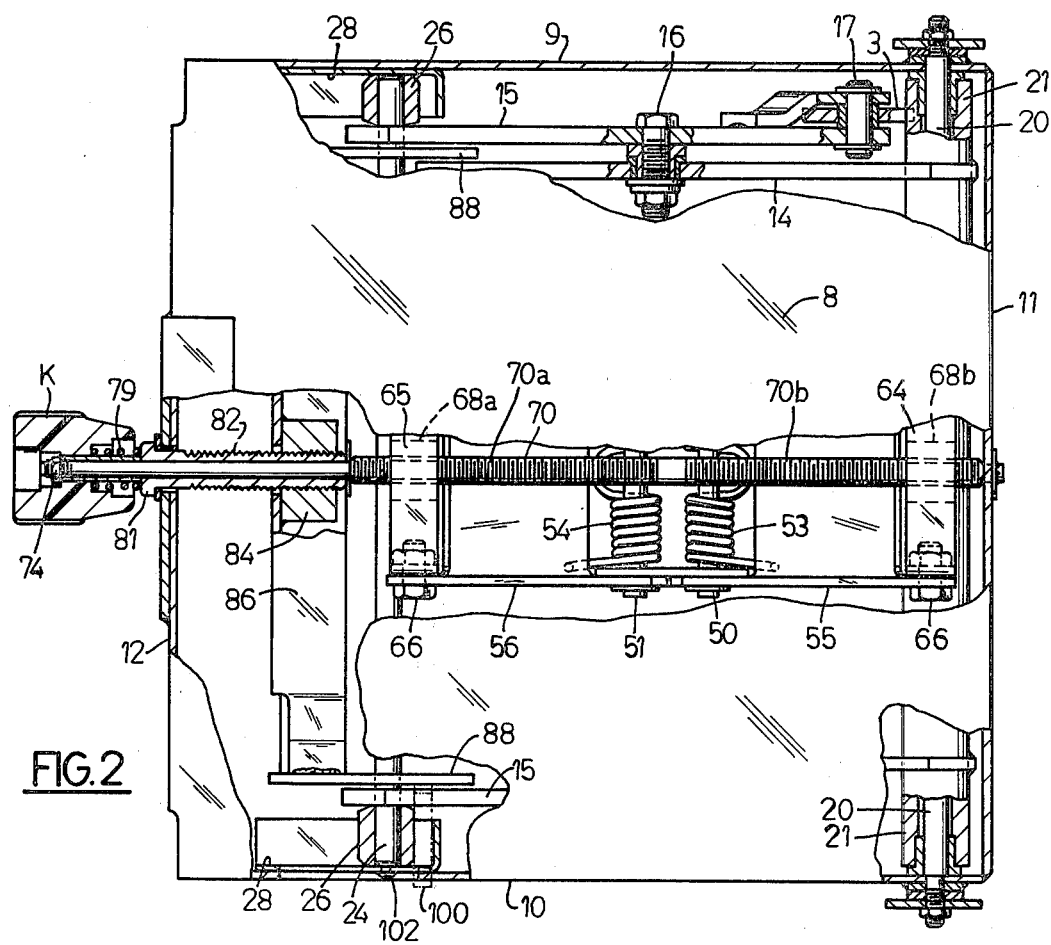
FIG. 2 is a plan view of the device shown in FIG. 1, certain parts being shown in section or broken away for the sake of clarity in the drawings.
Figure 1:
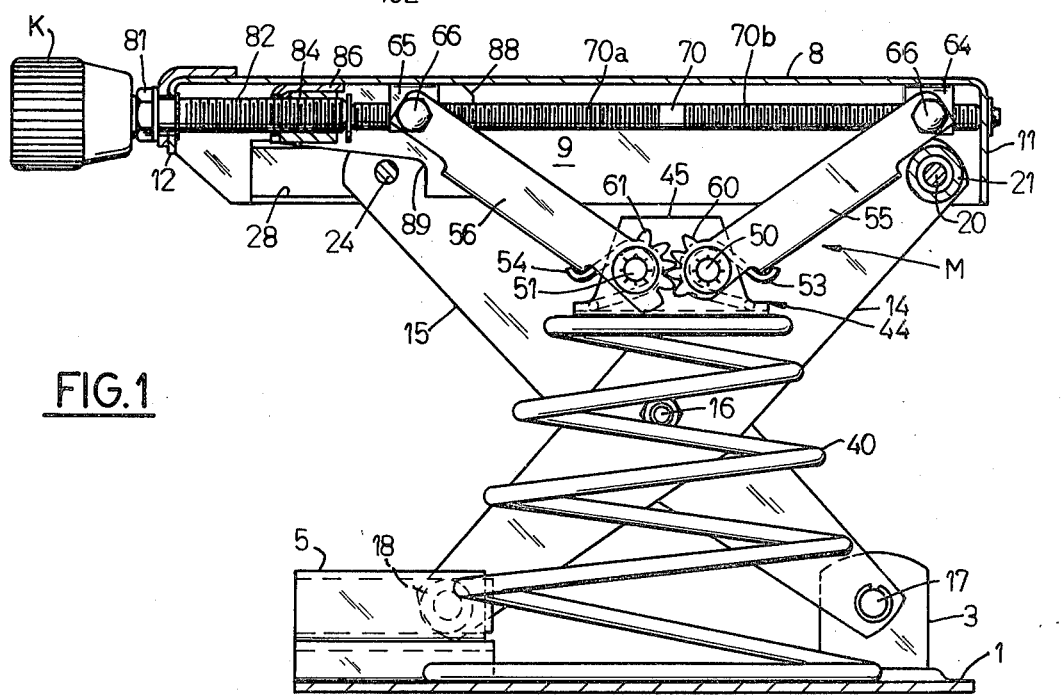
FIG. 1 is a side elevational view partially in section and with parts broken away of a seat suspension made in accordance with the present invention, the parts being indicated in the position as when a load is applied in a downward direction.
Figure 3:
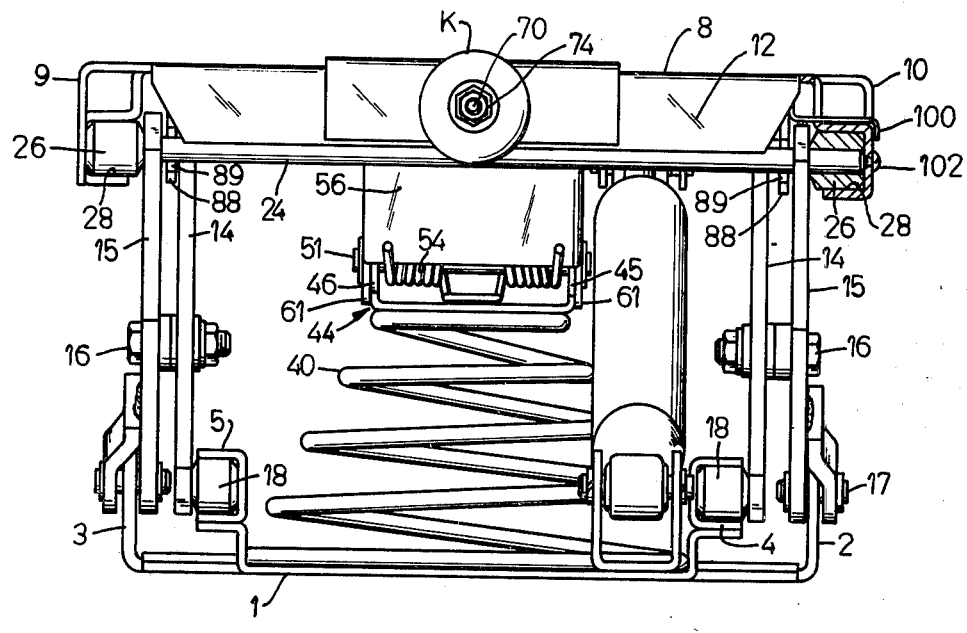
FIG. 3 is a front elevational view of the arrangement shown in FIGS. 1 and 2, certain parts being shown as broken away or in section.

The seat supporting assembly of the present invention includes a sheet metal base 1 adapted to be secured in any suitable manner to the vehicle frame (not shown). The base has a pair of rear upstanding brackets 2 and 3, one at each side of the rear portion of the base and which are preferably integrally formed with the base 1. At the forward end of the base and on either side thereof are longitudinally extending channel members 4 and 5 which are rigidly secured to the base 1. The assembly also includes an upper carriage platform 8 formed of sheet metal and having downwardly extending side portions 9 and 10 along each longitudinal side thereof and also having a downwardly extending rear wall 11 and a downwardly extending front wall 12. The upper carriage platform 8 is flat and unobstructed along its top surface and is adapted to securely support the vehicle seat (not shown). The platform 8 is vertically adjustable relative to the base 1 by means of two pairs of crossed pivotal arms 14 and 15, one pair at each side of the base 1 and the platform 8 and interconnected therebetween. More specifically, the arms 14 and 15 at each side of the seat are pivotally secured together intermediate their length by the bolt means 16. The lower ends of the arms 15 are pivotally secured as at 17 to the upstanding brackets 2 and 3 while the lower front ends of the arms 14 have rollers 18 mounted thereon for being supported in and guided along the horizontally shaped channel members 4 and 5. The upper ends of arms 14 are supported by the transverse shaft 20 to the upper platform 8, the shaft 20 also having a sleeve 21 thereon. More specifically, the arms are welded to spacer tube 21 rotatably mounted on shaft 20. The shaft and the arms rotate with tube 21 on the shaft 20. The front upper end of the arms 15 have a stop shaft 24 extending therethrough and protrude at either outer side of the arms 15 and to which outer ends of the shaft 24 a pair of rollers 26 are secured. These rollers are adapted to be rolled in and be guided by the inwardly facing channel members 28 which are secured to the inner side of the downwardly extending walls 9 and 10 of the platform seat. In this manner, the pair of arms 14 and 15 act as in scissors action to support the platform in various vertical positions relative to the base and at a constant attitude relative thereto.

Resilient means are provided for yieldingly supporting the platform 8 in any adjusted vertical position relative to the base as follows.

A large conical shaped coil spring 40 rests on and is secured to the base by its larger end and is generally centrally located under the platform 8. To the upper, smaller end of the conical spring 40 is secured a spring loaded platform 44 which is fabricated from sheet steel and has two upwardly extending, opposite sides 45 and 46, each of which has a pair of holes 47 extending therethrough. A pair of rods 50 and 51 extend through the aligned holes 47 and 48, respectively, and act to support and anchor the torsion coil springs 53 and 54, respectively. The rods 50, 51 also pivotally anchor the lower ends of bifurcated arms 55 and 56 by extending through holes 57 and 58, respectively, in the lower end of these arms. The arms 55 and 56 are formed from sheet metal and have interengaging teeth 60 and 61 at their lower ends, respectively. Thus, swinging movement of the arms about their rods 50 and 51 is equalized by the interengaging teeth 60 and 61 thus providing a smooth operating vertical movement of the platform 44 as the upper ends of arms 55 and 56 are moved toward and away from one another, as will appear.

A pair of slide blocks 64, 65 are pivotally connected by bolt means 66 to the upper ends of the arms and the slide blocks have nuts 68a and 68b of oppositely pitched internal threads welded centrally thereto and for the threaded reception of a main screw 70 also having oppositely pitched threaded portions 70a and 70b. Thus, rotation of the main screw 70 in one direction causes simultaneous outward movement of the sliding blocks relative to one another, that is away from one another, and rotation of the screw in the other direction causes simultaneous movement of the slide blocks inwardly, that is toward one another. When the slide blocks are moved outwardly away from one another, the upper platform is lowered and when the slide blocks are moved inwardly toward one another, the carriage is elevated relative to the base. At the forward end of the main screw 70 is fixed a nut 74, the nut having a slot 75 therein and a roll pin 76 extends through the end of the main screw and also through the slot 75 and the nut 74, thereby securing the nut 74 to the rod for rotation therewith. A manually adjusted knob extends forwardly of the seat assembly and within easy reach of the operator and the knob has a hexagon shaped bore 77 which complements the shape of the nut 74. When the knob K is pulled outwardly to the position shown in FIG. 6, the nut 74 is held captive in the hexagon shaped opening 77 and consequently rotating of the knob K in either direction causes similar rotation of the main screw, thereby providing a vertical adjustment for the platform 8 by causing the upper ends of the arms 55 and 56 to swing toward and away from one another as previously mentioned. The swinging movement of the arms is equalized by the teeth 60, 61 at their lower ends and the torsion coil springs 53 and 54 have their free ends bearing relatively against the arms 55 and 56 which bias the movement of the arms to the upward position.

Thus, the arms 55 and 56, springs 53 and 54, slide blocks 64 and 65 and the main screw 70 constitute a spring load mechanism which is located directly above and supported by the resilient coil spring 40. This vertical stacked arrangement of the spring 40 and the spring load mechanism M results in a compact seating structure requiring a minimum number of parts, such as linkages, stops, or other components found in prior art devices.

An up-stop is provided for limiting the upward movement of the seat assembly depending on the selection of the operator, and includes a knob K urged outwardly by spring 79. The knob K has another hexagon shaped opening 80 for the reception of the hexagon head 81 of the up-stop adjusting screw 82. Screw 82 is of the sleeve type and is mounted over the forward end of shaft 70 and is threadably engaged at its rearward end in a travelling nut 84. The travelling nut in turn is centrally fixed to the cross beam 86. The up-stop or cross beam 86 has a pair of hook members 88 rigidly attached at its one end and which define an upwardly facing hook 89. As will appear, the stop shaft 24 is engaged by the hook when the up-stop limit is reach, thereby preventing any further upward movement of the platform 8. For example, when the knob is pushed inwardly to a position shown in FIG. 5, it hexagon shaped opening 80 engages the nut end 81 of the adjusting screw 82 and consequently rotation of the knob in either direction causes rotation of the screw 82 in a similar direction and consequently causes forward or rearward travel of the up-stop beam 86. Thus, by adjusting the knob and the adjusting screw 82, the position of the up-stop beam and particularly the position of the hooks 89 in a fore and aft direction can be set. When the up-stop beam is shifted to the rearward position, the seat can assume a higher position because the up ended arms 15 can move farther to the rear. Conversely, when the up-stop beam is shifted to a forward position, a rearward movement of the upper ends of arms 15 is limited thereby limiting the height of the plateform 8.

Figure 4:
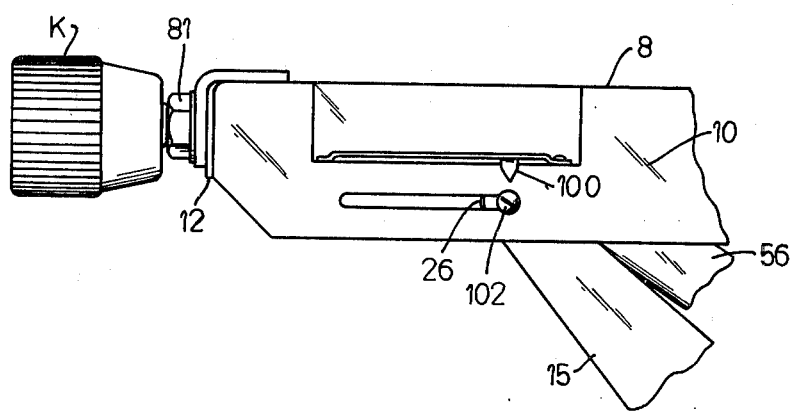
FIG. 4 is a fragmentary, side elevational view of the front portion of the seat shown in FIG. 1 and showing the adjustment indicator.
Figure 7:
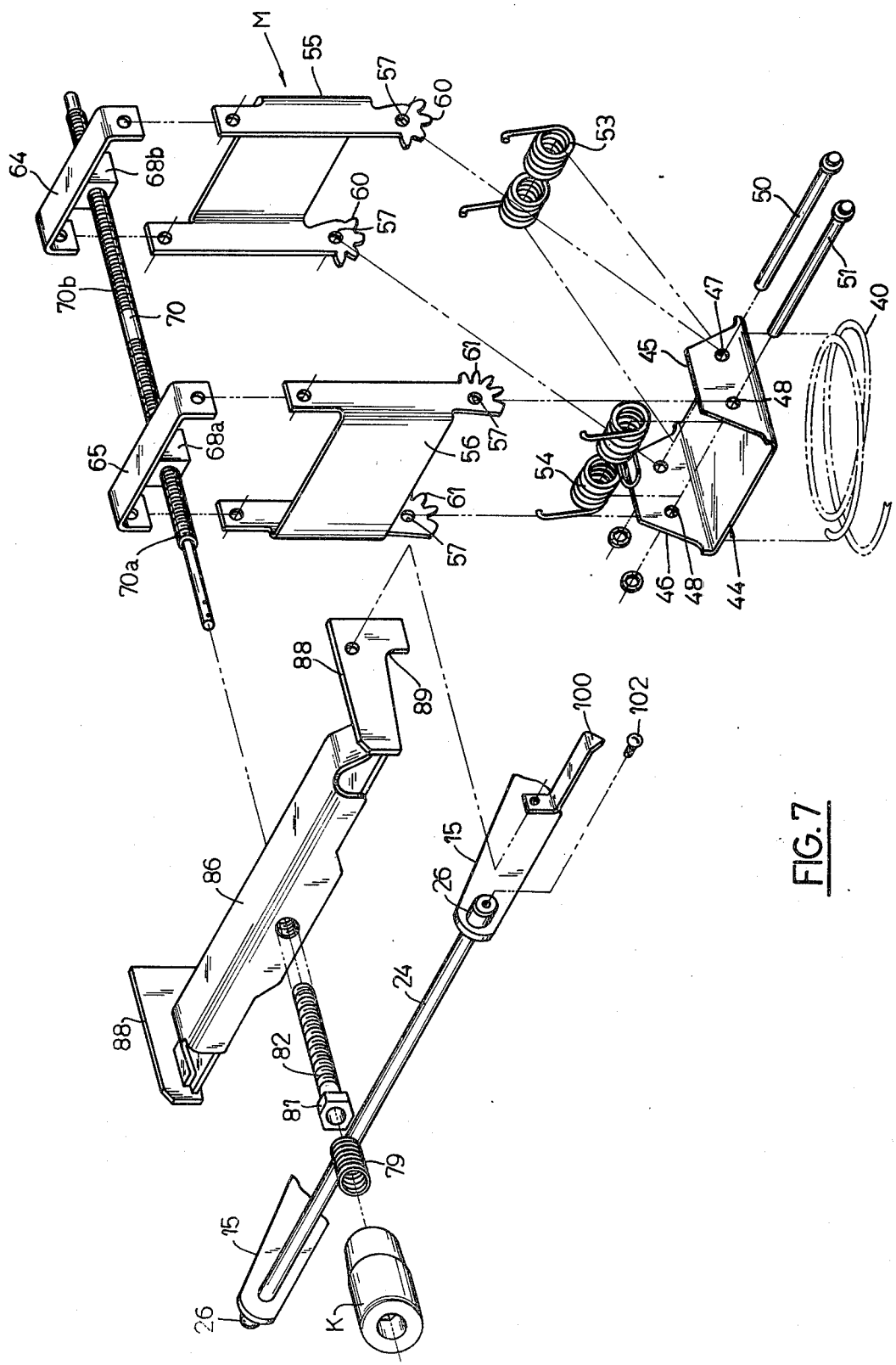
FIG. 7 is an exploded, perspective view of the upper portion of the mechanism shown in FIG. 1.

With this construction, the knob K can be used to adjust the height of the platform as for example when the knob is pulled outwardly as shown in FIG. 6 or the knob can be used to set the up-stop limit provided by the hooks 89 when the knob is pushed inwardly to engage the up-stop adjusting screw 82. In order to indicate to the operator the position of the up-stop, an indicating pointer 100 is attached to the end of the arm 88 and thus provides a ready indication to the operator at the side of the seat as shown in FIG. 4 as to the setting of the up-stop limit.

The height adjustment is first made by the operator so as to limit the height of the seat at the proper level for the particular operator involved. This height is then indicated by the screw 102 (FIG. 4) located on the end of the shaft 24 at the upper end of arm 15, and screw 102 is visible at the side of the seat. The operator then adjusts the up-limit stop so that the pointer 100 is in alignment with the screw 102 as shown in FIG. 4, thus providing a correct up-stop limit for any vertical setting of the seat.

We claim:

1. A seat supporting assembly comprising a lower base member, an upper seat platform for supporting a seat, linkage means connected between said base and said platform for vertically positioning the platform relative to the base, a spring mounted on the base and extending upwardly therefrom, a spring loaded mechanism mounted on the upper end of said spring and pivotally secured to said upper seat platform, mechanism for adjusting said spring loaded mechanism to raise and lower said platform relative to said base, an upstop limit for limiting the upward movement of said platform, said adjusting mechanism also having an actuator for selectively operating said up-stop limit or said adjusting mechanism.

2. The assembly set forth in claim 1 further characterized in that said spring load mechanism includes a pair of arms pivotally mounted at their lower ends and adjacent the upper end of said spring, the upper ends of said arms being swingable toward and away from one another, and said adjusting mechanism includes a screw having a pair of relatively movable slide blocks mounted thereon, said slide blocks being pivotally connected to the upper ends of said arms, whereby rotation of the screw causes movement of said slide blocks toward and away from one another and raising and lowering of said platform, respectively.

3. The assembly set forth in claim 2 further characterized in that said up-stop limit includes a transverse beam and said adjusting mechanism includes a threaded member threadably engaged with said beam for positioning said beam in a fore and aft direction, said linkage means being abuttable against said transverse beam.

4. The assembly set forth in claim 1 further characterized in that said up-stop limit includes a transverse beam and said adjusting mechanism includes a threaded member threadably engaged with said beam for positioning said beam in a fore and aft direction, said linkage means being abuttable against said transverse beam.

5. The assembly set forth in claim 2 further characterized in that said screw is rotatably mounted on said platform, and said actuator is an adjustable knob detachably connected to said screw for rotating the latter.

6. The assembly set forth in claim 3 further characterized in that said screw is rotatably mounted on said platform, and said actuator is an adjustable knob detachably connected to said screw for rotating the latter.

7. The assembly set forth in claim 6 further characterized in that said knob has a detachable connection with said threaded member for rotating the latter to adjust said limit means 8. A seat supporting assembly comprising a lower base member, an upper seat platform for supporting a seat, linkage means pivotally connected between said base and said platform for vertically positioning the platform relative to the base, a spring mounted on the base and extending upwardly therefrom and having an upper end, a spring loaded mechanism mounted on the upper end of said spring and pivotally secured to said upper seat platform, said spring loaded mechanism including a platform secured to said upper end of said spring, a pair of arms having lower ends pivotally connected with said upper end of said spring, said arms having interengaging gear teeth at their lower ends for equalizing movement between said arms, said arms having upper ends swingable toward and away from one another, adjusting mechanism including a screw having a pair of relatively movable slide blocks mounted thereon, said slide blocks being pivotally connected to said upper ends of said arms, whereby rotation of the screw causes movement of said slide blocks toward and away from one another and raising and lowering of said platform, respectively, an up-stop limit for limiting the upward movement of said platform, said adjusting mechanism also having an actuator for selectively operating said up-stop limit or said adjusting mechanism.

9. The assembly set forth in claim 8 further characterized in that said up-stop limit includes a shiftable transverse beam and said adjusting mechanism includes a threaded member threadably engaged with said beam for positioning said beam in a fore and aft direction, said linkage means being abuttable against said transverse beam.

10. The assembly set forth in claim 8 further characterized in that said screw is rotatably mounted on said platform, and said actuator is an adjustable knob detachably connected to said screw for rotating the latter.

* * * * *